(12) United States Patent
Handley et al.

(10) Patent No.: US 8,352,298 B2
(45) Date of Patent: Jan. 8, 2013

(54) SYSTEMS AND METHODS TO DETECT MODELS AND ACCOUNTS WITH ANOMALOUS REVENUE FROM COLOR IMPRESSIONS

(75) Inventors: John C. Handley, Fairport, NY (US); Jeffrey R. Earl, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 437 days.

(21) Appl. No.: 12/702,052

(22) Filed: Feb. 8, 2010

(65) Prior Publication Data

US 2011/0194768 A1 Aug. 11, 2011

(51) Int. Cl.
*G06Q 10/00* (2006.01)
(52) U.S. Cl. .................... 705/7.11; 705/1.1
(58) Field of Classification Search ............. 705/7.11, 705/1.1
See application file for complete search history.

(56) References Cited

U.S. PATENT DOCUMENTS

| | | | |
|---|---|---|---|
| 2003/0115156 A1* | 6/2003 | Baker | 705/400 |
| 2004/0086185 A1* | 5/2004 | Sun | 382/224 |
| 2007/0083368 A1* | 4/2007 | Handley | 704/245 |
| 2009/0006176 A1* | 1/2009 | Handley | 705/10 |

* cited by examiner

*Primary Examiner* — Thomas L Mansfield, Jr.
(74) *Attorney, Agent, or Firm* — Fox Rothschild LLP

(57) ABSTRACT

Methods and systems for identifying device models or accounts exhibiting outlying behavior are disclosed. For a method of identifying a device model exhibiting outlying behavior, a processor may receive a color impression count, a monochrome impression count and either a device model for each of a plurality of devices. A proportion of color revenue may be determined for each device based on the color impression count and the monochrome impression count. The processor may determine, for each device model, a distribution of the proportion of color revenue for the one or more devices having the device model and may automatically identify one or more distributions of the proportion of color revenue exhibiting outlying behavior. Each distribution is associated with a device model.

20 Claims, 11 Drawing Sheets

US 8,352,298 B2

SYSTEMS AND METHODS TO DETECT MODELS AND ACCOUNTS WITH ANOMALOUS REVENUE FROM COLOR IMPRESSIONS

BACKGROUND

Fundamental to business intelligence are the notions of regular behavior and exceptional behavior. When large numbers of business or economic processes are aggregated and viewed through collected data, a continuum typically results. Exceptional behavior often is the result of some discrete phenomenon that warrants investigation. Such a phenomenon could represent an exceptional risk or opportunity for the business.

A managed service is a service offering in which a vendor assumes operation of a portion of an enterprise's assets and provides technical services and/or supplies for such assets for a fee. As a form of outsourcing, it allows the enterprise to focus on its core business while enabling the assets of an enterprise to receive improved service at reduced cost.

One type of managed service involves managing an enterprise's printer assets and print services (i.e., a managed print service). In a managed print service, a vendor typically provides devices having one or more of a plurality of device models to an enterprise.

Business intelligence regarding managed print service accounts can identify exceptional behavior for particular device models and/or accounts. For example, exceptional behavior for color revenue generation in managed print services can be determined. For example, when negotiating a contract for a managed print service offering, account managers seek to meet the needs of the account while also providing printing devices with model types that generate good revenue streams. As such, it is important for account managers to identify whether particular printing device models generate acceptable revenue streams, particularly from color impressions. In addition, account managers would typically like to know whether particular accounts have sub-par or exceptional behavior with respect to generating revenue from color impressions. The model types of printing devices in sub-par accounts could be modified to increase color impression revenue. Conversely, the model types of printing devices in exceptional accounts could be mimicked in other accounts to attempt to generate profitable revenue streams from other accounts.

However, simply reviewing the proportion of revenue from color impressions across all printing devices having a particular model type is insufficient to distinguish exceptional or sub-par device models from typical device models. Considerable variation in distributions of color revenue is typical. Similarly, reviewing the proportion of revenue from color impressions across accounts is insufficient to distinguish exceptional or sub-par accounts from typical accounts.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used in this document, the term "comprising" means "including, but not limited to."

In an embodiment, a system for identifying a device model exhibiting outlying behavior may include a processor and a memory in operable communication with the processor containing one or more programming instructions for receiving, by the processor for each of a plurality of devices, a color impression count, a monochrome impression count, and a device model for the device, determining, for each device, a proportion of color revenue for the device based on the color impression count and the monochrome impression count, determining, by the processor for each device model, a distribution of the proportion of color revenue for the one or more devices having the device model, and automatically identifying one or more distributions of the proportion of color revenue exhibiting outlying behavior. Each distribution is associated with a device model.

In an embodiment, a method of identifying a device model exhibiting outlying behavior may include receiving, by the processor for each of a plurality of devices, a color impression count, a monochrome impression count, and a device model for the device, determining, for each device, a proportion of color revenue for the device based on the color impression count and the monochrome impression count, determining, by the processor for each device model, a distribution of the proportion of color revenue for the one or more devices having the device model, and automatically identifying one or more distributions of the proportion of color revenue exhibiting outlying behavior.

In an embodiment, a system for identifying an account exhibiting outlying behavior may include a processor, and a memory in operable communication with the processor, containing one or more programming instructions for receiving, by the processor for each of a plurality of devices, a color impression count, a monochrome impression count, and an account in which the device is used, and determining, for each device, a proportion of color revenue for the device based on the color impression count and the monochrome impression count, determining, by the processor for each account, a distribution of the proportion of color revenue for the one or more devices associated with the account, and automatically identifying one or more distributions of the proportion of color revenue exhibiting outlying behavior. Each distribution is associated with an account.

In an embodiment, a method of identifying an account exhibiting outlying behavior may include receiving, by the processor for each of a plurality of devices, a color impression count, a monochrome impression count, and an account for the device, determining, for each device, a proportion of color revenue for the device based on the color impression count and the monochrome impression count, determining, by the processor for each account, a distribution of the proportion of color revenue for the one or more devices associated with the account, and automatically identifying one or more distributions of the proportion of color revenue exhibiting outlying behavior, wherein each distribution is associated with an account.

DETAILED DESCRIPTION

The following terms shall have, for the purposes of this application, the respective meanings set forth below.

A "printing device" refers to an electronic apparatus that is capable of receiving commands, printing text, vector graphics and/or images on a substrate and/or scanning a document. Printing devices may include, but are not limited to, network printers, production printers, copiers, facsimile machines and/or other devices using ink or toner.

"Price per impression" or "PPI" refers to the revenue generated from printing an image on a single side of a single sheet of paper and/or other substrate by a printing device.

"Color PPI" refers to the revenue generated from printing a color image on a single side of a single sheet of paper and/or other substrate by a printing device.

"Monochrome PPI" refers to the revenue generated from printing a black-and-white or monochrome image on a single side of a single sheet of paper and/or other substrate by a printing device.

An "outlier" refers to a data point having greater than a predetermined deviation from an empirically-determined function.

A "device model" refers to a designation for a device. For example, a device model for a printing device may be represented by a manufacturer's name and a designator used to identify the printing device.

A pricing model for operating color printing devices typically includes a color PPI and a monochrome PPI. In an embodiment, the managed print service uses these values to determine an amount to bill an account by tracking a color impression count and a monochrome impression count in a given billing period and multiplying the impression counts by the color PPI and monochrome PPI, respectively.

Figure 1:
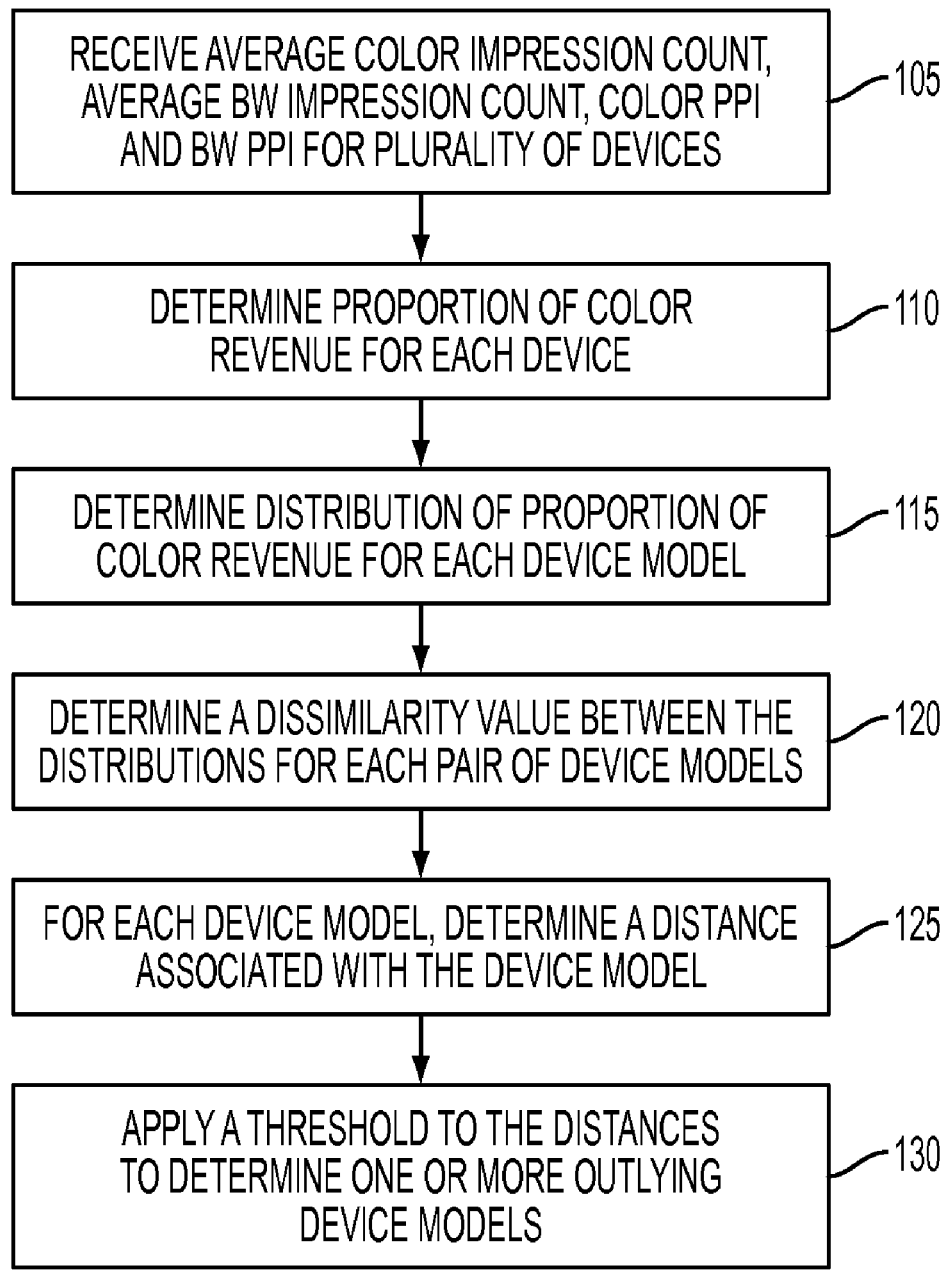
FIG. 1 depicts a flow diagram of an exemplary method of identifying a device model exhibiting outlying behavior according to an embodiment.

FIG. 1 depicts a flow diagram of an exemplary method of identifying a device model exhibiting outlying behavior according to an embodiment. As shown in FIG. 1, a color impression count (such as an average color impression count), a monochrome impression count (such as an average monochrome impression count), a color PPI and a monochrome PPI may be received 105 for each of a plurality of devices. As used herein, an average count refers to any datum that is reasonably derived from a plurality of input points. The information may be received as part of a typical managed print service operation across a plurality of accounts. The color impression count and the monochrome impression count may be representative counts within a period of time, such as a day, a week, a month, a billing cycle for an account or the like. In an embodiment, the impression counts and PPIs may be received 105 at a system operated by an account manager.

The proportion of color revenue for each of the plurality of devices may be determined 110 based on the color impression count, the monochrome impression count, the color PPI and the monochrome PPI. In an embodiment, the proportion of color revenue for a device may be determined 110 by calculating $$\alpha = \frac{x_C p_C}{x_B p_B + x_C p_C},$$

where $\alpha$ is the proportion of color revenue, $x_C$ is the color impression count, $p_C$ is the price per color impression for the device, $x_B$ is the monochrome impression count, and $p_B$ is the price per monochrome impression for the device.

Figure 2:
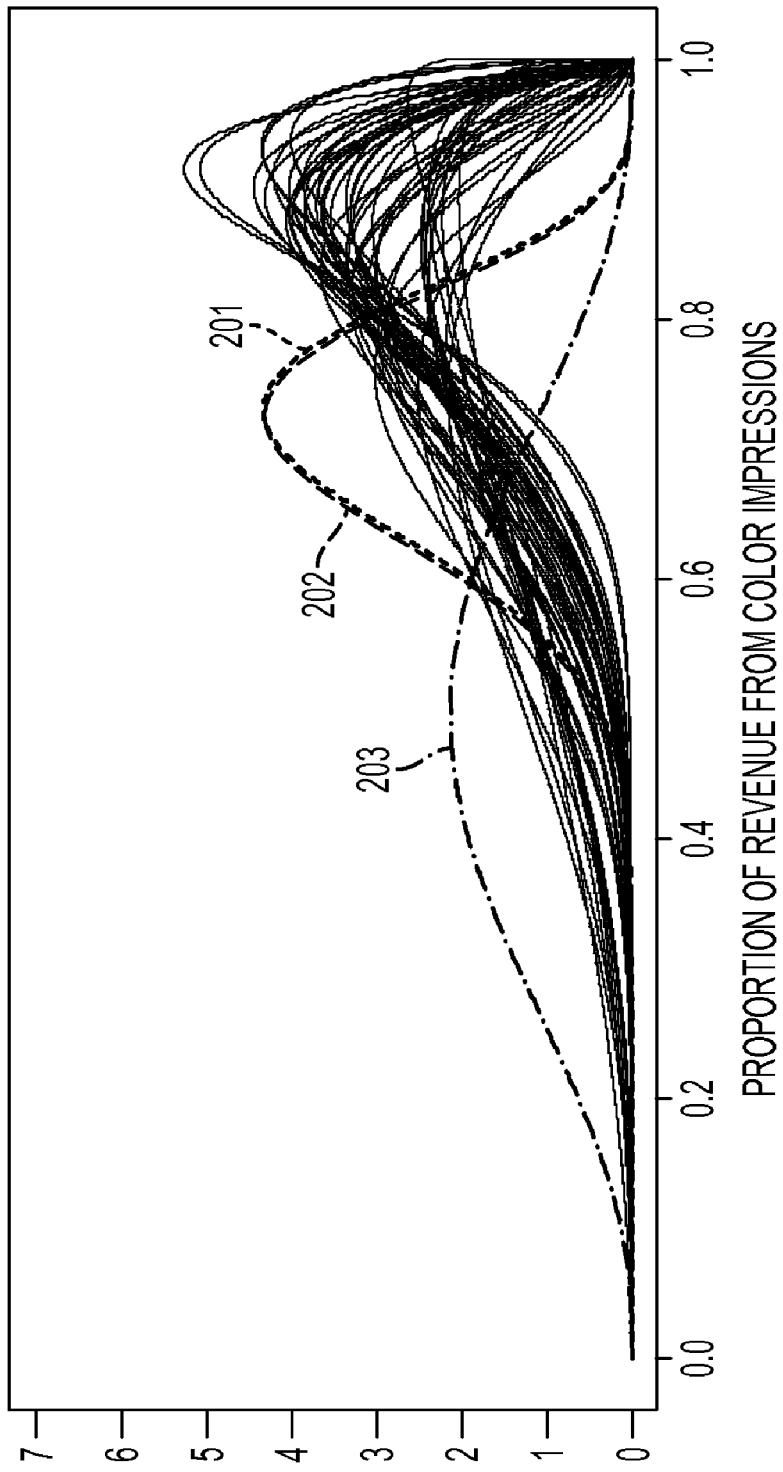
FIG. 2 depicts a plurality of exemplary distributions for the proportion of revenue from color impressions for a plurality of printer models according to an embodiment.

For each device model, a distribution of the proportion of color revenue may be determined 115 for the one or more devices having the device model. As such, if the proportion of color revenue is considered for each device of a particular device model, $\alpha$ may be considered to be a random variable taking values between 0 and 1. FIG. 2 depicts a plurality of exemplary distributions for the proportion of revenue from color impressions for a plurality of printer models according to an embodiment. As depicted in FIG. 2, most distributions show a broad continuum and likely result from a regular business or economic process. In contrast, three distributions 201-203 exhibit outlying behavior.

Figure 3B:
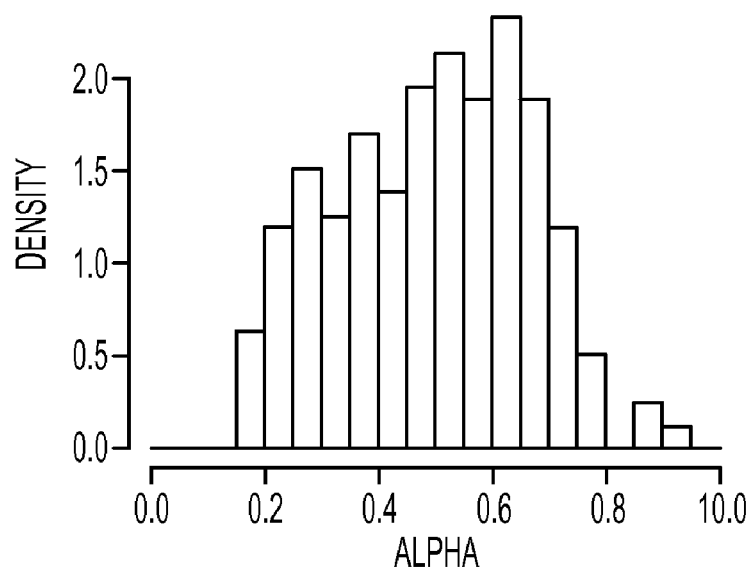
FIG. 3B depicts a graph of densities of the proportions of color revenue based on the data depicted in FIG. 3A.
Figure 4A:
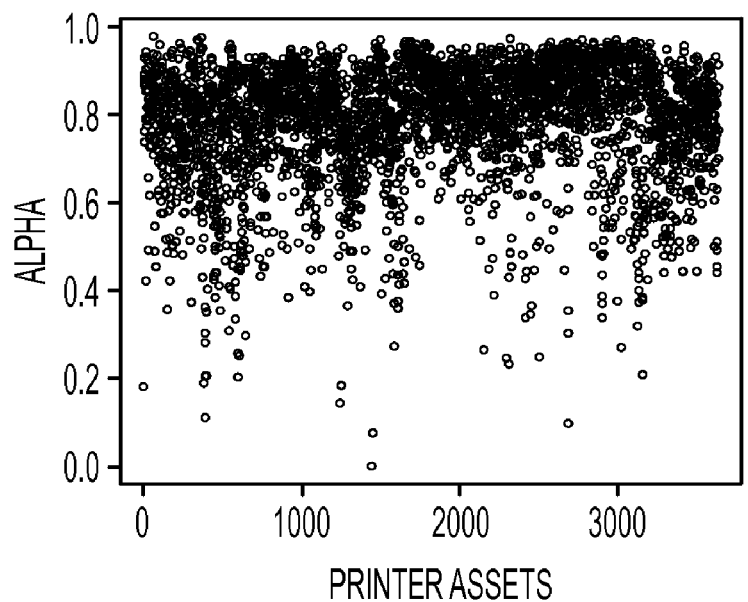
FIG. 4A depicts a graph of exemplary proportions of color revenue for a plurality of printing devices of a second device model according to an embodiment.
Figure 4B:
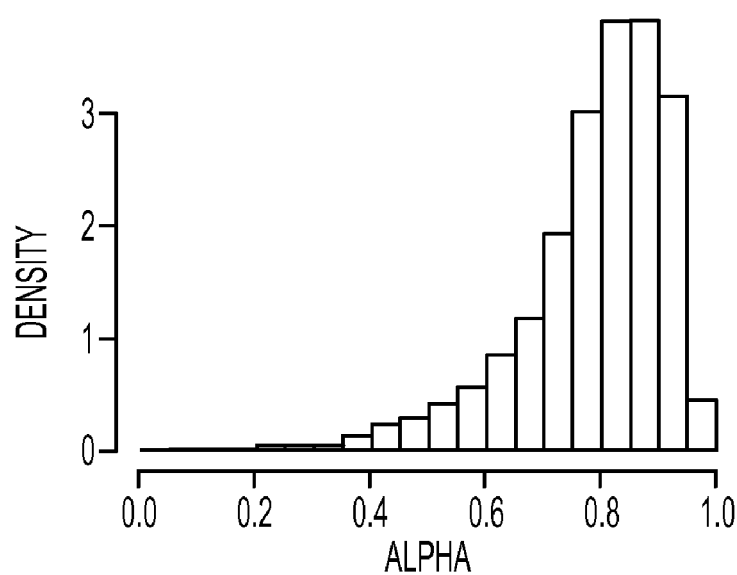
FIG. 4B depicts a graph of densities of the proportions of color revenue based on the data depicted in FIG. 4A.

In an embodiment, the distribution of the proportion of color revenue for each device model may be determined 115 by forming a discrete probability distribution. Exemplary discrete probability distributions are shown in FIGS. 3B and 4B. The manner of forming such discrete probability distributions is discussed below.

Figure 3A:
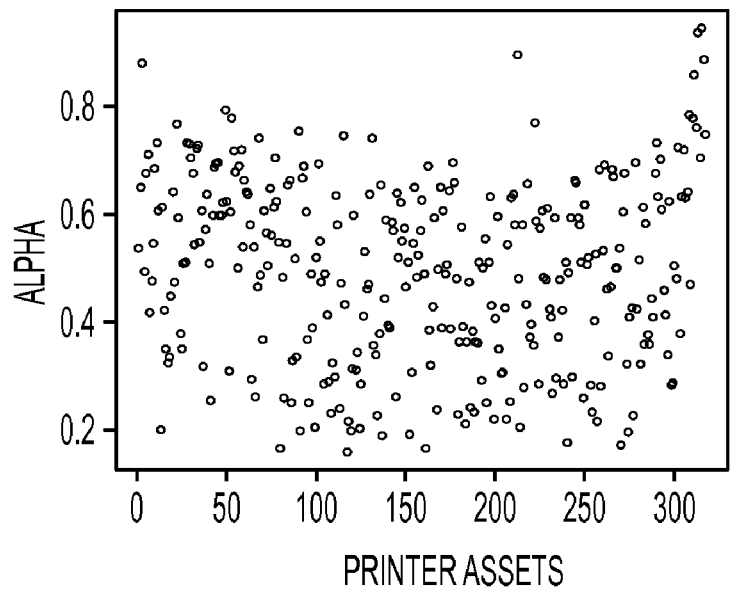
FIG. 3A depicts a graph of exemplary proportions of color revenue for a plurality of printing devices of a first device model according to an embodiment.

FIG. 3A depicts a graph of exemplary proportions of color revenue for a plurality of printing devices of a first device model according to an embodiment. The value of $\alpha$ for each printing device of the first device model is associated with a numerical identifier for the device and plotted on FIG. 3A. FIG. 3B depicts a graph of densities of the proportions of color revenue based on the data depicted in FIG. 3A. In particular, each device represented in FIG. 3A is assigned to one of a plurality of bins shown in FIG. 3B based on the value of $\alpha$ for the device. In an embodiment, the density value assigned to each bin may be based on the proportion of devices having the first device model that have a proportion of color revenue in a range assigned to the bin. The ranges assigned to the bins may be based on the value of $\alpha$ and may range from, for example and without limitation, [0, 0.05), [0.05, 0.1), ..., [0.95, 1]. Alternate ranges may be used within the scope of this disclosure. FIGS. 4A and 4B may depict a graph of exemplary proportions of color revenue for a plurality of printing devices of a second device model and a graph of densities of the proportions of color revenue based on the data depicted in FIG. 4A, respectively, and may be determined in a similar manner to the graphs in FIGS. 3A and 3B.

Referring back to FIG. 1, one or more distributions of the proportion of color revenue exhibiting outlying behavior may be identified automatically, such as by a processor or other computing device. An account manager may examine characteristics of the device models corresponding to the outlying distributions.

In an embodiment, automatically identifying a distribution of the proportion of color revenue exhibiting outlying behavior may include determining 120 a dissimilarity value between each pair of discrete probability distributions. In an embodiment, the dissimilarity value may be computed using the Jensen-Shannon divergence:

$$JS(p, q) = H\left(\frac{1}{2}p + \frac{1}{2}q\right) - \frac{1}{2}H(p) - \frac{1}{2}H(q),$$

where p and q are discrete probability distributions, p has bins $(p_1, \ldots, p_n)$, q has bins $(q_1, \ldots, q_n)$, and $H(x) = \Sigma_{i-1}^{n} x_i \log(x_i)$ (i.e., the entropy of x). The dissimilarity values may be used to form a dissimilarity matrix $D = [d_{ij}]_{1 \leq i,j \leq n}$, where $d_{ij}$ is the Jensen-Shannon divergence between the distributions for device models i and j.

Once the dissimilarity values between pairs of device models are determined, a multidimensional distribution of the distributions of the proportion of color revenue may be determined based on the dissimilarity values. In an embodiment, a multidimensional scaling algorithm may be performed to determine the multidimensional distribution. The multidimensional scaling algorithm may utilize a set of pairwise distances, such as dissimilarity matrix D, and may determine coordinates in, for example, a two-dimensional plane (x, y) for each device model such that the pairwise Euclidian distances between device models are as close as possible to the dissimilarity values between device models. This is achieved by minimizing the following value across all pairs of device models:

$$\sum_{1 \leq i \leq j \leq N} \left[ d_{ij} - \sqrt{(x_i - x_j)^2 + (y_i - y_j)^2} \right]^2.$$

The squared difference between the dissimilarity matrix and the coordinates is called the stress of the mapping. If the stress is lower, the representation is more closely aligned to the dissimilarity matrix. Variations on this particular multidimensional scaling algorithm include Sammon mapping, Kruskal's nonmetric method, isoMap and the like.

Figure 5:
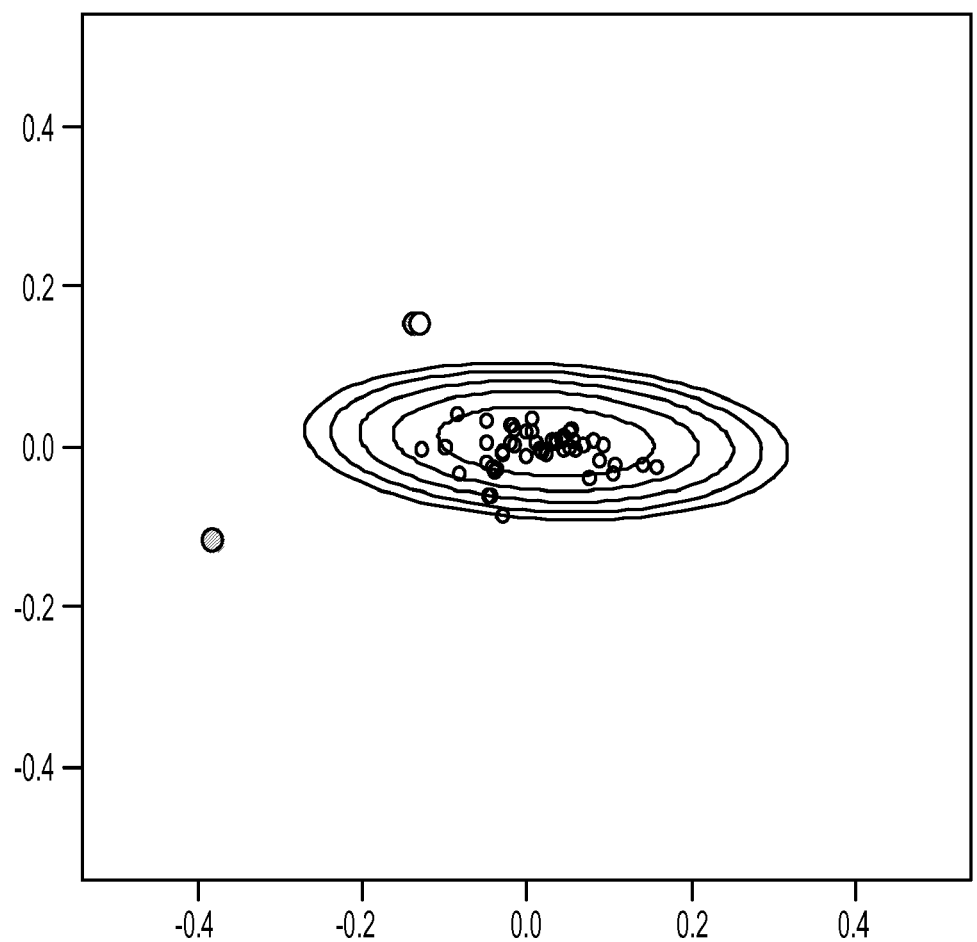
FIG. 5 depicts a scatter plot of exemplary distances between a plurality of printer models using a multidimensional scaling algorithm according to an embodiment.

Using the multidimensional scaling algorithm, a plot of the coordinates may be produced. A plot of exemplary distances between the distributions of the proportion of color revenue for the plurality of device models shown in FIG. 2 using a multidimensional scaling algorithm is shown in FIG. 5. As shown in FIG. 5, each point corresponds to a particular device model. The location of each device model may represent the difference between the device model and a median device model.

In some cases, such as is shown in FIG. 5, data may be skewed in one direction. As such, a value along one axis may have more weight in determining differentiation from a median device model than a value along the other axis. In order to determine distances from a center point (such as a median device model), a distance, such as the Mahalanobis distance, may be determined 125, as described below.

The two-dimensional distribution can be defined using a mean vector and a covariance matrix. In estimating these values, a robust statistical procedure may be used to compute the distribution of regular behavior. Using a robust statistical procedure (i.e., a procedure that is not perturbed significantly by outlying data points) may allow the determination of exceptional behavior by particular device models. The covariance matrix and estimated mean vector are two examples of robust estimators because they are largely unaffected by outlying data points.

Once determined, the estimated covariance $\hat{\Sigma}$ and estimated mean $\hat{\mu}$ can be used to determine 125 a distance from the center point for each device model. This distance may be the Mahalanobis distance for the device model: $d(x, \hat{\mu}) = (x-\hat{\mu})^T \hat{\Sigma}^{-1} (x-\hat{\mu})$. The Mahalanobis distance is scaled in indifferent directions according to the variance in that direction.

Figure 6:
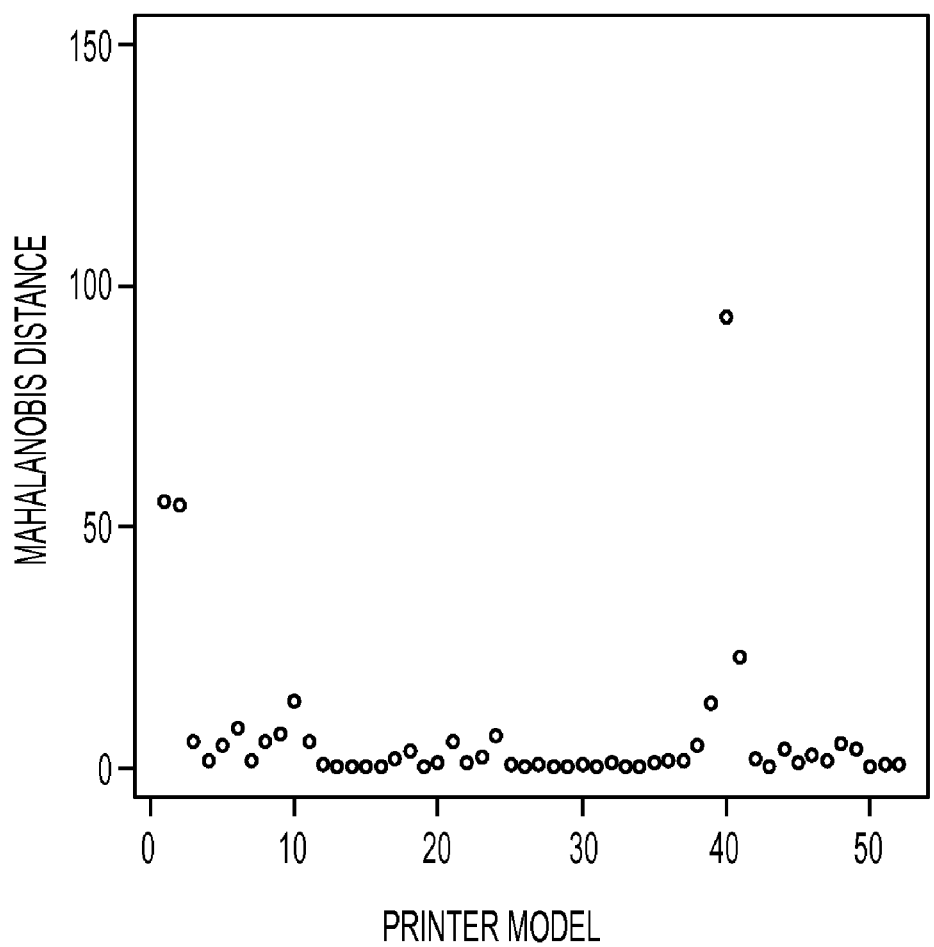
FIG. 6 depicts a graph of exemplary Mahalanobis distances for a plurality of device models based on the data depicted in FIG. 5.

FIG. 6 depicts a graph of exemplary Mahalanobis distances for a plurality of device models based on the data depicted in FIG. 5. In an embodiment, a threshold may be applied 130 to the Mahalanobis distance to determine the outlying device models. For example, applying 130 a threshold of 40 to the Mahalanobis distances in FIG. 6 results in three device models being identified as outliers. These three device models correspond to the three device models exhibiting a low proportion of color revenue as compared to the remainder of the device models in FIG. 2 (i.e., 201-203).

Figure 7:
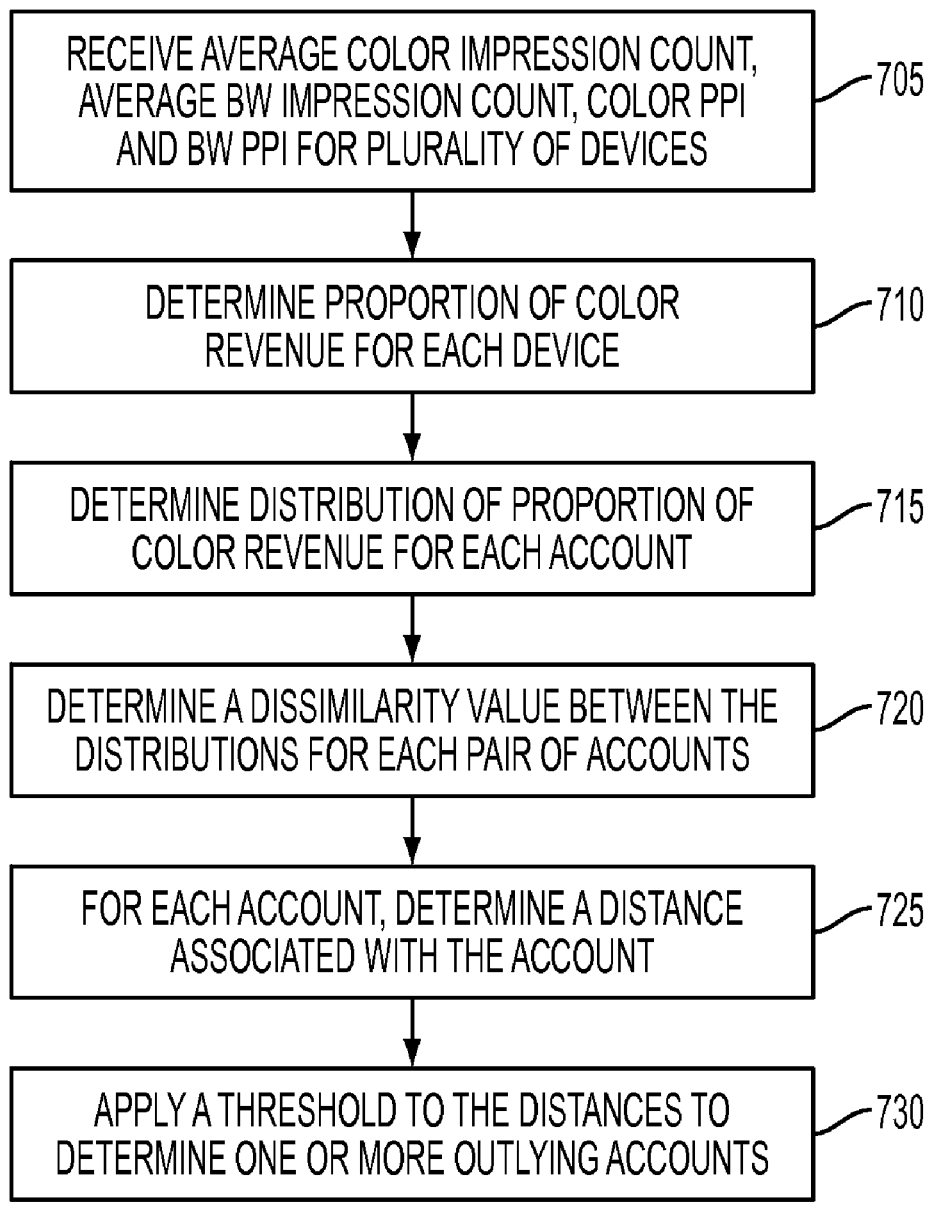
FIG. 7 depicts a flow diagram of an exemplary method of identifying an account exhibiting outlying behavior according to an embodiment.

FIG. 7 depicts a flow diagram of an exemplary method of identifying an account exhibiting outlying behavior according to an embodiment. As shown in FIG. 7, a color impression count (such as an average color impression count), a monochrome impression count (such as an average monochrome impression count), a color PPI and a monochrome PPI may be received 705 for each of a plurality of devices, where each device is associated with an account. The information may be received as part of a typical managed print service operation for a plurality of devices within each of a plurality of accounts. The color impression count and the monochrome impression count may be representative counts within a period of time, such as a day, a week, a month, a billing cycle for an account or the like. In an embodiment, the impression counts and PPIs may be received 705 at a system operated by an account manager.

The proportion of color revenue for each device in an account may be determined 710 based on the color impression count, the monochrome impression count, the color PPI and the monochrome PPI. In an embodiment, the proportion of color revenue for a device may be determined 710 by calculating $$\alpha = \frac{x_C p_C}{x_B p_B + x_C p_C},$$

where $\alpha$ is the proportion of color revenue, $x_C$ is the color impression count, $p_C$ is the price per color impression for the account, $x_B$ is the monochrome impression count, and $p_B$ is the price per monochrome impression for the device.

Figure 8:
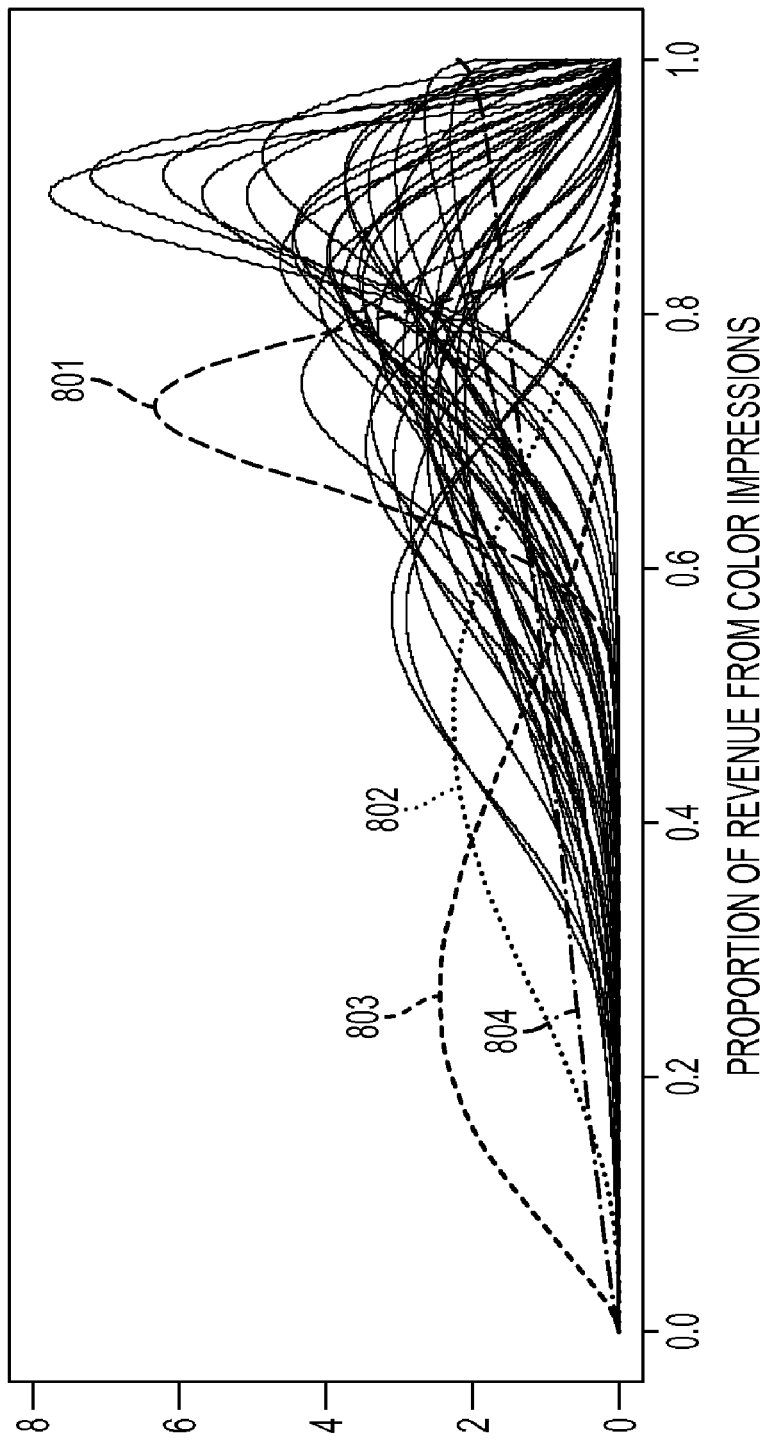
FIG. 8 depicts a plurality of exemplary distributions for the proportion of revenue from color impressions for a plurality of accounts according to an embodiment.

For each account, a distribution of the proportion of color revenue may be determined 715 for the devices in the account. As such, if the proportion of color revenue is considered for each device in a particular account, $\alpha$ may be considered to be a random variable taking values between 0 and 1. FIG. 8 depicts a plurality of exemplary distributions for the proportion of revenue from color impressions for a plurality of accounts according to an embodiment. As depicted in FIG. 8, most distributions show a broad continuum and likely result from a regular business or economic process. In contrast, at least four distributions, such as 801-804, exhibit outlying behavior.

In an embodiment, the distribution of the proportion of color revenue for each account may be determined 715 by forming a discrete probability distribution. The manner of forming such discrete probability distributions is similar to that discussed above in reference to FIGS. 3A, 3B, 4A and 4B.

Referring back to FIG. 7, one or more distributions of the proportion of color revenue exhibiting outlying behavior may be identified automatically, such as by a processor or other computing device. An account manager may examine characteristics of the accounts corresponding to the outlying distributions.

In an embodiment, automatically identifying a distribution of the proportion of color revenue exhibiting outlying behavior may include determining 720 a dissimilarity value between each pair of discrete probability distributions. In an embodiment, the dissimilarity value may be computed using the Jensen-Shannon divergence:

$$JS(p, q) = H\left(\frac{1}{2}p + \frac{1}{2}q\right) - \frac{1}{2}H(p) - \frac{1}{2}H(q),$$

where p and q are discrete probability distributions, p has bins $(p_1, \ldots, p_n)$, q has bins $(q_1, \ldots, q_n)$, and $H(x) = \Sigma_{i-1}{}^n x_i \log(x_i)$ (i.e., the entropy of x). The dissimilarity values may then be used to form a dissimilarity matrix $D = [d_{ij}]_{1 \leq i,j \leq n}$, where $d_{ij}$ is the Jensen-Shannon divergence between the distributions for accounts i and j.

Once the dissimilarity values between pairs of accounts are determined, a multidimensional distribution of the distributions of the proportion of color revenue may be determined based on the dissimilarity values. In an embodiment, a multidimensional scaling algorithm may be performed to determine the multidimensional distribution. The multidimensional scaling algorithm takes a set of pairwise distances, such as dissimilarity matrix D, and determines coordinates in, for example, a two-dimensional plane (x, y) for each account such that the pairwise Euclidian distances between accounts are as close as possible to the dissimilarity values between accounts. This is achieved by minimizing the following value across all pairs of accounts:

$$\sum_{1 \leq i \leq j \leq N} \left[d_{ij} - \sqrt{(x_i - x_j)^2 + (y_i - y_j)^2}\right]^2.$$

The squared difference between the dissimilarity matrix and the coordinates is called the stress of the mapping. If the stress is lower, the representation is more closely aligned to the dissimilarity matrix. Variations on this particular multidimensional scaling algorithm include Sammon mapping, Kruskal's nonmetric method, isoMap and the like.

Figure 9:
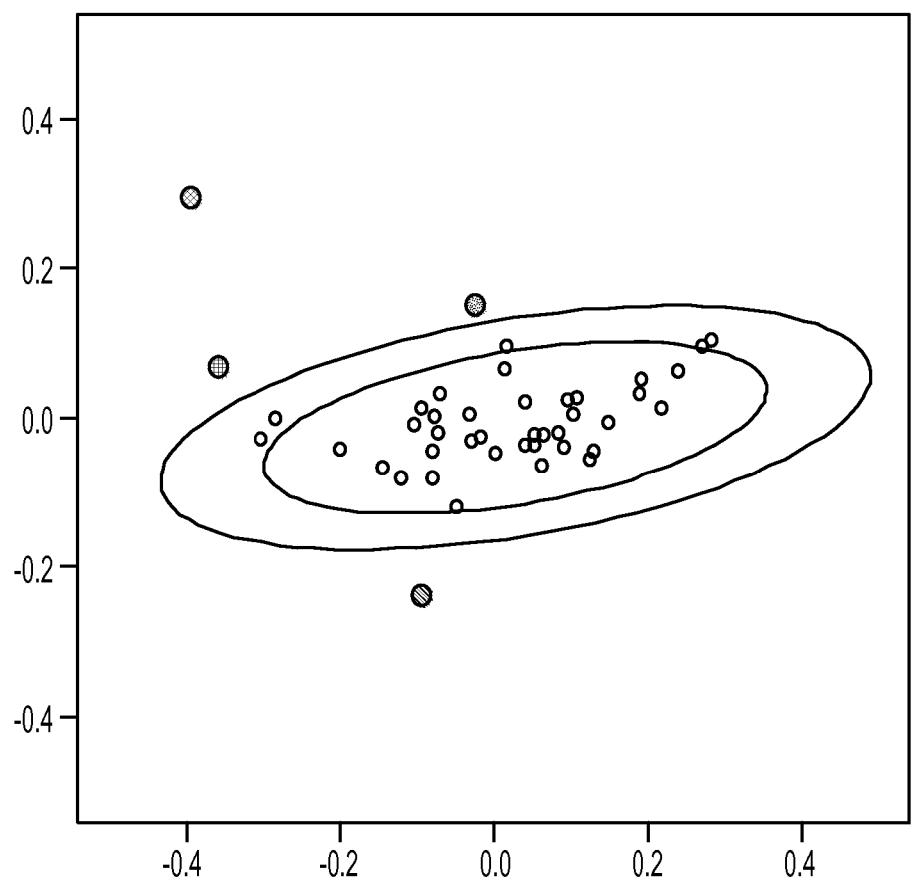
FIG. 9 depicts a scatter plot of exemplary distances between a plurality of accounts using a multidimensional scaling algorithm according to an embodiment.

Using the multidimensional scaling algorithm, a plot of the coordinates may be produced. A plot of exemplary distances between the distributions of the proportion of color revenue for the plurality of accounts shown in FIG. 8 using a multidimensional scaling algorithm is shown in FIG. 9. As shown in FIG. 9, each point corresponds to a particular account. The location of each account may represent the difference between the account and a median account.

In some cases, such as is shown in FIG. 9, data may be skewed in one direction. As such, a value along one axis may have more weight in determining differentiation from a median account than a value along the other axis. In order to determine distances from a center point (such as a median account), a distance, such as the Mahalanobis distance, may be determined 725, as described below.

The two-dimensional distribution can be defined using a mean vector and a covariance matrix. In estimating these values, a robust statistical procedure may be used to compute the distribution of regular behavior. Using a robust statistical procedure (i.e., a procedure that is not perturbed significantly by outlying data points) may allow the determination of exceptional behavior by particular accounts. The covariance matrix and estimated mean vector are two examples of robust estimators because they are largely unaffected by outlying data points.

Once determined, the estimated covariance $\hat{\Sigma}$ and estimated mean $\hat{\mu}$ can be used to determine 725 a distance from the center point for each account. This distance is the Mahalanobis distance for the account: $d(x, \hat{\mu}) = (x-\hat{\mu})^T \hat{\Sigma}^{-1} (x-\hat{\mu})$. The Mahalanobis distance is scaled in indifferent directions according to the variance in that direction.

Figure 10:
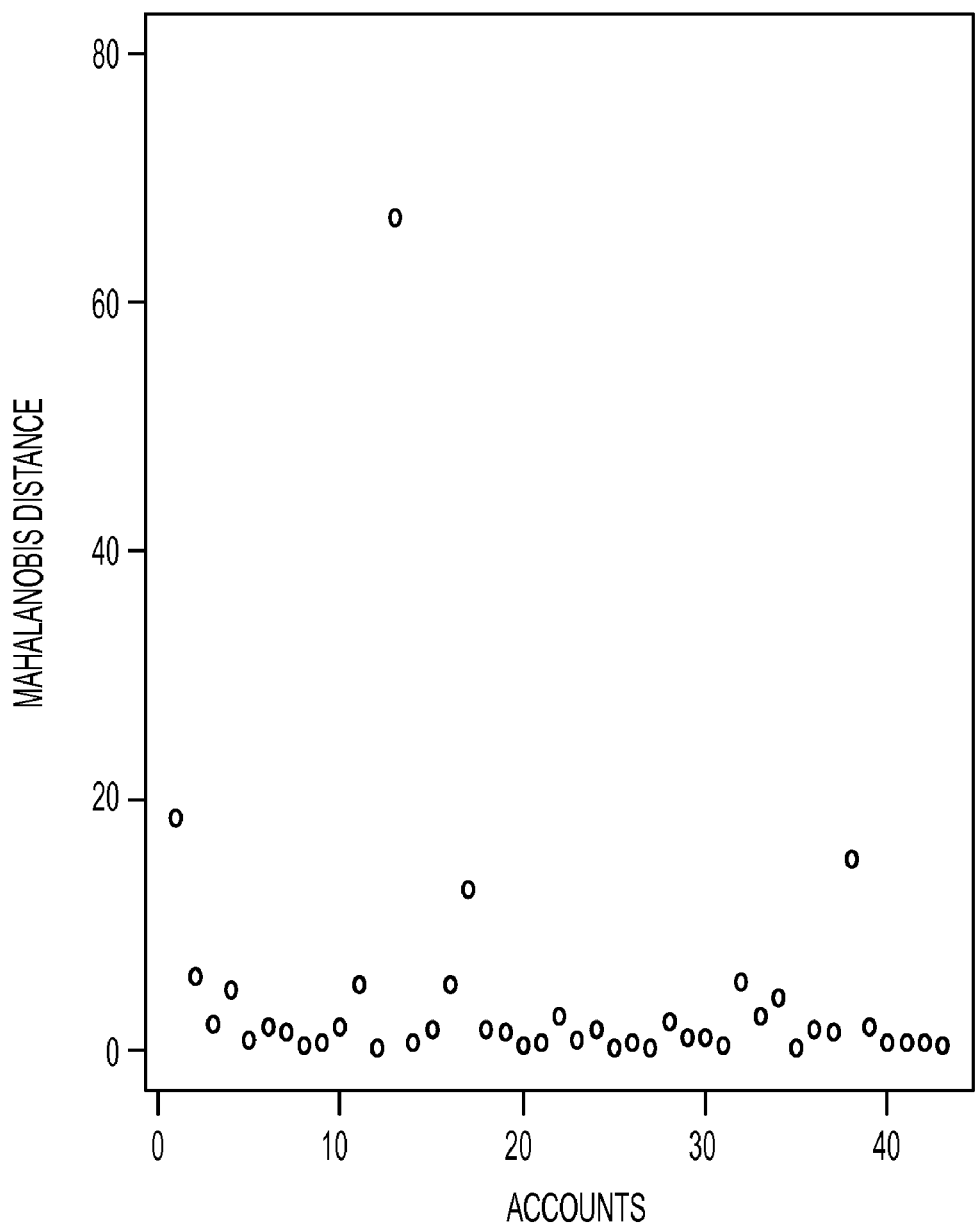
FIG. 10 depicts a graph of exemplary Mahalanobis distances for a plurality of accounts based on the data depicted in FIG. 9.

FIG. 10 depicts a graph of exemplary Mahalanobis distances for a plurality of accounts based on the data depicted in FIG. 9. In an embodiment, a threshold may be applied 730 to the Mahalanobis distance to determine the outlying accounts. For example, applying 730 a threshold of 10 to the Mahalanobis distances in FIG. 10 results in four accounts being identified as outliers. These four accounts correspond to the accounts exhibiting a low proportion of color revenue as compared to the remainder of the accounts in FIG. 8 (i.e., 801-804).

Figure 11:
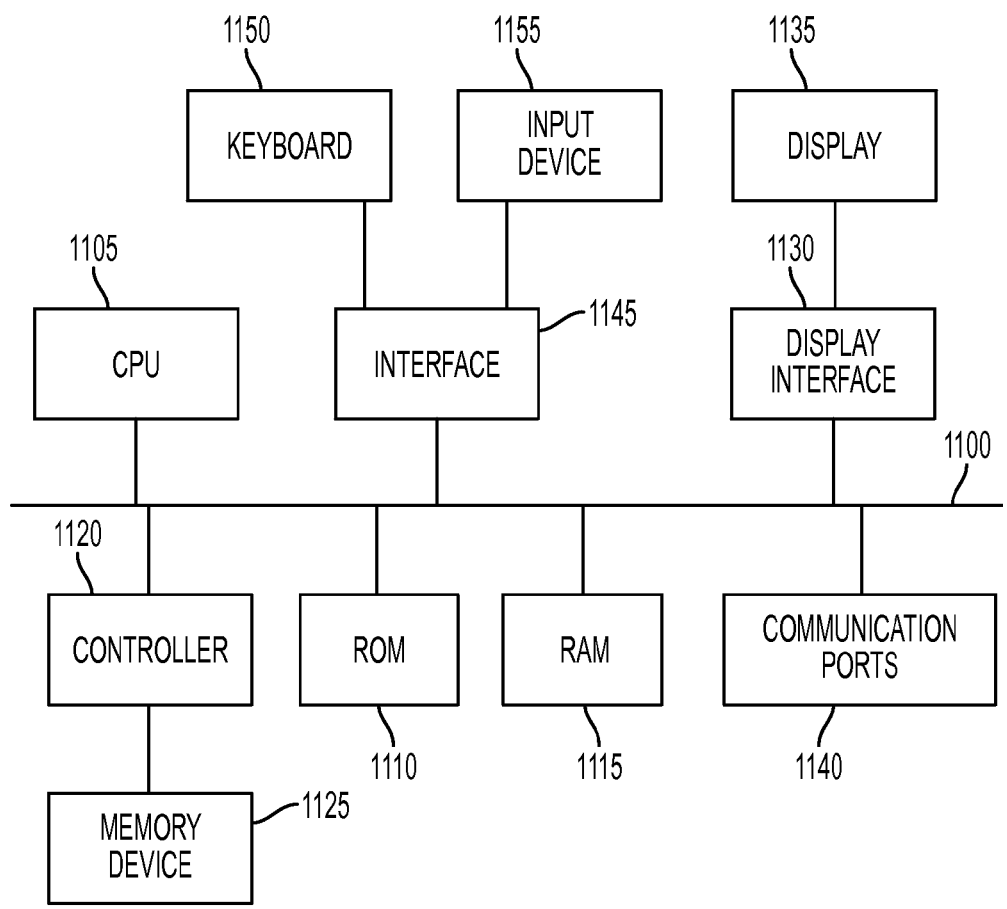
FIG. 11 depicts a block diagram of exemplary internal hardware that may be used to contain or implement program instructions according to an embodiment.

FIG. 11 depicts a block diagram of exemplary internal hardware that may be used to contain or implement program instructions according to an embodiment. A bus 1100 serves as the main information highway interconnecting the other illustrated components of the hardware. CPU 1105 is the central processing unit of the system, performing calculations and logic operations required to execute a program. Read only memory (ROM) 1110 and random access memory (RAM) 1115 constitute exemplary memory devices.

A controller 1120 interfaces with one or more optional memory devices 1125 to the system bus 1100. These memory devices 1125 may include, for example, an external or internal DVD drive, a CD ROM drive, a hard drive, flash memory, a USB drive or the like. As indicated previously, these various drives and controllers are optional devices.

Program instructions may be stored in the ROM 1110 and/or the RAM 1115. Optionally, program instructions may be stored on a tangible computer readable storage medium such as a compact disk, a digital disk, flash memory, a memory card, a USB drive, an optical disc storage medium, such as Blu-ray™ disc, and/or other recording medium.

An optional display interface 1130 may permit information from the bus 1100 to be displayed on the display 1135 in audio, visual, graphic or alphanumeric format. Communication with external devices may occur using various communication ports 1140. An exemplary communication port 1140 may be attached to a communications network, such as the Internet or an intranet.

The hardware may also include an interface 1145 which allows for receipt of data from input devices such as a keyboard 1150 or other input device 1155 such as a mouse, a joystick, a touch screen, a remote control, a pointing device, a video input device and/or an audio input device.

An embedded system, such as a sub-system within a printing device or xerographic device, may optionally be used to perform one, some or all of the operations described herein. Likewise, a multiprocessor system may optionally be used to perform one, some or all of the operations described herein.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for identifying a device model exhibiting outlying behavior, the system comprising:
    a computer processor; and
    a memory in operable communication with the computer processor,
    wherein the memory comprises one or more programming instructions that, when executed, cause the computer processor to:
        for each of a plurality of devices:
            receive a color impression count, a monochrome impression count, and a device model for the device, and
            determine a proportion of color revenue for the device based on the color impression count and the monochrome impression count,
        for each device model, determine a distribution of the proportion of color revenue for the one or more devices having the device model, and
        automatically identify one or more distributions of the proportion of color revenue exhibiting outlying behavior, wherein each distribution is associated with a device model, by:
            determining a dissimilarity value between each pair of distributions of the proportion of color revenue,
            determining a multidimensional distribution of the distributions of the proportion of color revenue based on the dissimilarity values,
            determining a Mahalanobis distance for the distribution associated with each device model based on the multidimensional distribution, and
            automatically identifying each device model having a distribution having a distance that exceeds a threshold.

2. The system of claim 1 wherein the one or more programming instructions that, when executed, cause the computer processor to determine a proportion of color revenue comprise one or more programming instructions that, when executed, cause the computer processor to determine $$\frac{x_C p_C}{x_B p_B + x_C p_C},$$

where $x_C$ is the color impression count, $p_C$ is the price per color impression for the device, $x_B$ is the monochrome impression count, and $p_B$ is the price per monochrome impression for the device.

3. The system of claim 1, wherein the one or more programming instructions that, when executed, cause the computer processor to determine a dissimilarity value between each pair of distributions of the proportion of color revenue comprise one or more programming instructions that, when executed, cause the computer processor to:
    select a first discrete probability distribution of the proportion of color revenue corresponding to a first device model;
    select a second discrete probability distribution of the proportion of color revenue corresponding to a second device model; and
    determine the dissimilarity value between the first discrete probability distribution and the second discrete probability distribution, wherein the dissimilarity value comprises a Jensen-Shannon divergence between the first discrete probability distribution and the second discrete probability distribution.

4. The system of claim 1, wherein the one or more programming instructions that, when executed, cause the computer processor to determine a multidimensional distribution of the distributions of the proportion of color revenue based on the dissimilarity values comprise one or more programming instructions that, when executed, cause the computer processor to:
    generate a dissimilarity matrix $D=[d_{ij}]_{1 \leq i,j \leq n}$, where $d_{ij}$ comprises the dissimilarity value between a distribution for an $i^{th}$ device model and a distribution for a $j^{th}$ device model; and
    determine a multidimensional distribution for the distributions of the proportion of color revenue using a multidimensional scaling algorithm.

5. The system of claim 4, wherein the multidimensional scaling algorithm comprises one or more of the following: multidimensional scaling, Sammon mapping, Kruskal's non-metric method, and isoMap.

6. A method of identifying a device model exhibiting outlying behavior, the method comprising:
    for each of a plurality of devices:
        receiving, by a computer processor, a color impression count, a monochrome impression count, and a device model for the device, and
        determining a proportion of color revenue for the device based on the color impression count and the monochrome impression count;
    for each device model, determining, by the computer processor, a distribution of the proportion of color revenue for the one or more devices having the device model; and
    automatically identifying one or more distributions of the proportion of color revenue exhibiting outlying behavior by:
        determining, by the computer processor, a dissimilarity value between each pair of distributions of the proportion of color revenue,
        determining, by the computer processor, a multidimensional distribution of the distributions of the proportion of color revenue based on the dissimilarity values,
        determining, by the computer processor, a Mahalanobis distance for the distribution associated with each device model based on the multidimensional distribution, and
        automatically identifying each device model having a distribution having a distance that exceeds a threshold.

7. The method of claim 6, wherein determining a proportion of color revenue comprises determining $$\frac{x_C p_C}{x_B p_B + x_C p_C},$$

where $x_C$ is the color impression count, $p_C$ is the price per color impression for the device, $x_B$ is the monochrome impression count, and $p_B$ is the price per monochrome impression for the device.

8. The method of claim 6, wherein determining a dissimilarity value between each pair of distributions of the proportion of color revenue comprises:
   selecting a first discrete probability distribution of the proportion of color revenue corresponding to a first device model;
   selecting a second discrete probability distribution of the proportion of color revenue corresponding to a second device model; and
   determining the dissimilarity value between the first discrete probability distribution and the second discrete probability distribution, wherein the dissimilarity value comprises a Jensen-Shannon divergence between the first discrete probability distribution and the second discrete probability distribution.

9. The method of claim 6, wherein determining a multidimensional distribution of the distributions of the proportion of color revenue based on the dissimilarity values comprises:
   generating a dissimilarity matrix $D=[d_{ij}]_{1 \leq i,j \leq n}$, where $d_{ij}$ comprises the dissimilarity value between a distribution for an $i^{th}$ device model and a distribution for a $j^{th}$ device model; and
   determining a multidimensional distribution for the distributions of the proportion of color revenue using a multidimensional scaling algorithm.

10. The method of claim 9, wherein the multidimensional scaling algorithm comprises one or more of the following: multidimensional scaling, Sammon mapping, Kruskal's nonmetric method, and isoMap.

11. A system for identifying an account exhibiting outlying behavior, the system comprising:
   a computer processor; and
   a memory in operable communication with the computer processor,
   wherein the memory comprises one or more programming instructions that, when executed, cause the computer processor to:
      for each of a plurality of devices:
         receive a color impression count, a monochrome impression count, and an account in which the device is used, and
         determine a proportion of color revenue for the device based on the color impression count and the monochrome impression count,
      for each account, determine a distribution of the proportion of color revenue for the one or more devices associated with the account, and
      automatically identify one or more distributions of the proportion of color revenue exhibiting outlying behavior, wherein each distribution is associated with an account, by:
         determining a dissimilarity value between each pair of distributions of the proportion of color revenue,
         determining a multidimensional distribution of the distributions of the proportion of color revenue based on the dissimilarity values,
         determining a Mahalanobis distance for the distribution associated with each account based on the multidimensional distribution, and
         automatically identifying each account having a distribution having a distance that exceeds a threshold.

12. The system of claim 11, wherein the one or more programming instructions that, when executed, cause the computer processor to determine a proportion of color revenue comprise one or more programming instructions that, when executed, cause the computer processor to determine $$\frac{x_C p_C}{x_B p_B + x_C p_C},$$

where $x_C$ is the color impression count, $p_C$ is the price per color impression for the device, $x_B$ is the monochrome impression count, and $p_B$ is the price per monochrome impression for the device.

13. The system of claim 11, wherein the one or more programming instructions that, when executed, cause the computer processor to determine a dissimilarity value between each pair of distributions of the proportion of color revenue comprise one or more programming instructions that, when executed, cause the computer processor to:
   select a first discrete probability distribution of the proportion of color revenue corresponding to a first account;
   select a second discrete probability distribution of the proportion of color revenue corresponding to a second account; and
   determine the dissimilarity value between the first discrete probability distribution and the second discrete probability distribution, wherein the dissimilarity value comprises a Jensen-Shannon divergence between the first discrete probability distribution and the second discrete probability distribution.

14. The system of claim 11, wherein the one or more programming instructions that, when executed, cause the computer processor to determine a multidimensional distribution of the distributions of the proportion of color revenue based on the dissimilarity values comprise one or more programming instructions that, when executed, cause the computer processor to:
   generate a dissimilarity matrix $D=[d_{ij}]_{1 \leq i,j \leq n}$, where $d_{ij}$ comprises the dissimilarity value between a distribution for an $i^{th}$ account and a distribution for a $j^{th}$ account; and
   determine a multidimensional distribution for the distributions of the proportion of color revenue using a multidimensional scaling algorithm.

15. The system of claim 14, wherein the multidimensional scaling algorithm comprises one or more of the following: multidimensional scaling, Sammon mapping, Kruskal's nonmetric method, and isoMap.

16. A method of identifying an account exhibiting outlying behavior, the method comprising:
   for each of a plurality of devices:
      receiving, by a computer processor, a color impression count, a monochrome impression count, and an account for the device, and
      determining a proportion of color revenue for the device based on the color impression count and the monochrome impression count;

for each account, determining, by the computer processor, a distribution of the proportion of color revenue for the one or more devices associated with the account; and automatically identifying one or more distributions of the proportion of color revenue exhibiting outlying behavior, wherein each distribution is associated with an account, by determining, by the computer processor, a dissimilarity value between each pair of distributions of the proportion of color revenue, determining, by the computer processor, a multidimensional distribution of the distributions of the proportion of color revenue based on the dissimilarity values, determining, by the computer processor, a Mahalanobis distance for the distribution associated with each account based on the multidimensional distribution, and automatically identifying each account having a distribution having a distance that exceeds a threshold.

17. The method of claim 16, wherein determining a proportion of color revenue comprises determining $$\frac{x_C p_C}{x_B p_B + x_C p_C},$$

where $x_C$ is the color impression count, $p_C$ is the price per color impression for the device, $x_B$ is the monochrome impression count, and $p_B$ is the price per monochrome impression for the device.

18. The method of claim 16, wherein determining a dissimilarity value between each pair of distributions of the proportion of color revenue comprises:

selecting a first discrete probability distribution of the proportion of color revenue corresponding to a first account;

selecting a second discrete probability distribution of the proportion of color revenue corresponding to a second account; and determining the dissimilarity value between the first discrete probability distribution and the second discrete probability distribution, wherein the dissimilarity value comprises a Jensen-Shannon divergence between the first discrete probability distribution and the second discrete probability distribution.

19. The method of claim 16, wherein determining a multidimensional distribution of the distributions of the proportion of color revenue based on the dissimilarity values comprises:

generating a dissimilarity matrix $D=[d_{ij}]_{1 \leq i,j \leq n}$, where $d_{ij}$ comprises the dissimilarity value between a distribution for an $i^{th}$ account and a distribution for a $j^{th}$ account; and determining a multidimensional distribution for the distributions of the proportion of color revenue using a multidimensional scaling algorithm.

20. The method of claim 19, wherein the multidimensional scaling algorithm comprises one or more of the following: multidimensional scaling, Sammon mapping, Kruskal's nonmetric method, and isoMap.

* * * * *